Oct. 5, 1943.  E. F. ANDREWS  2,330,803
AIRCRAFT
Filed June 14, 1937   7 Sheets-Sheet 1
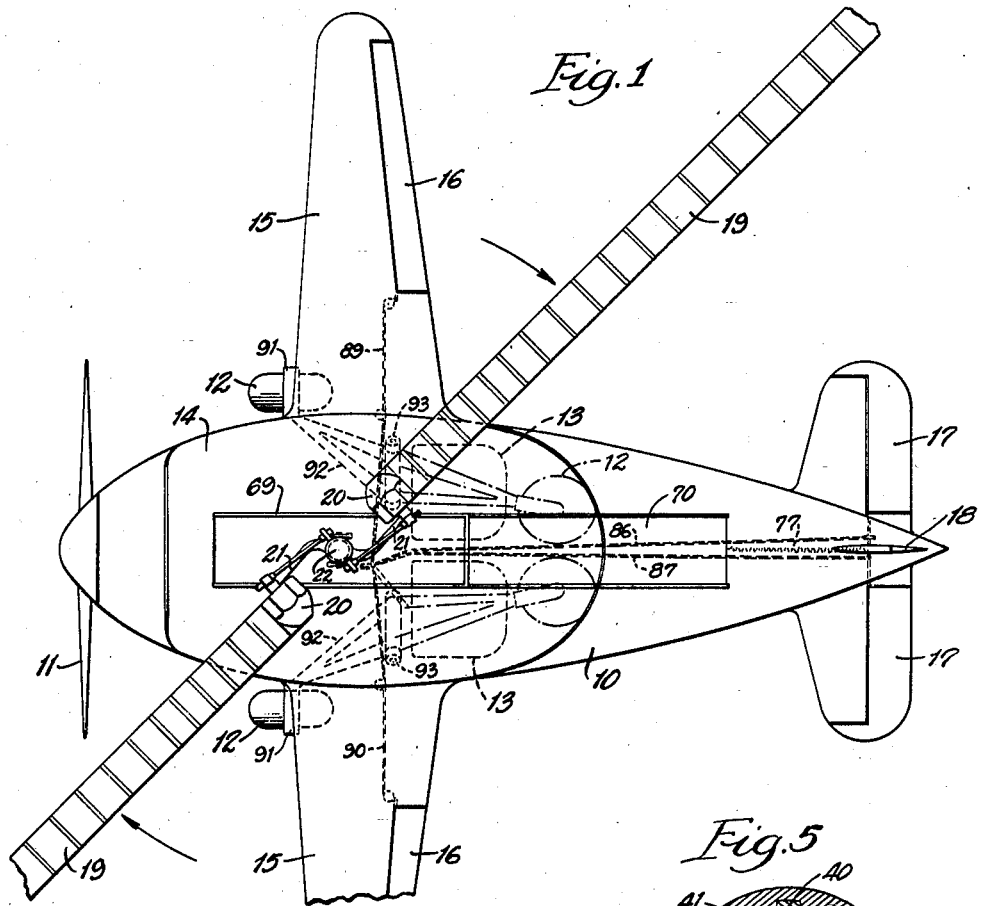
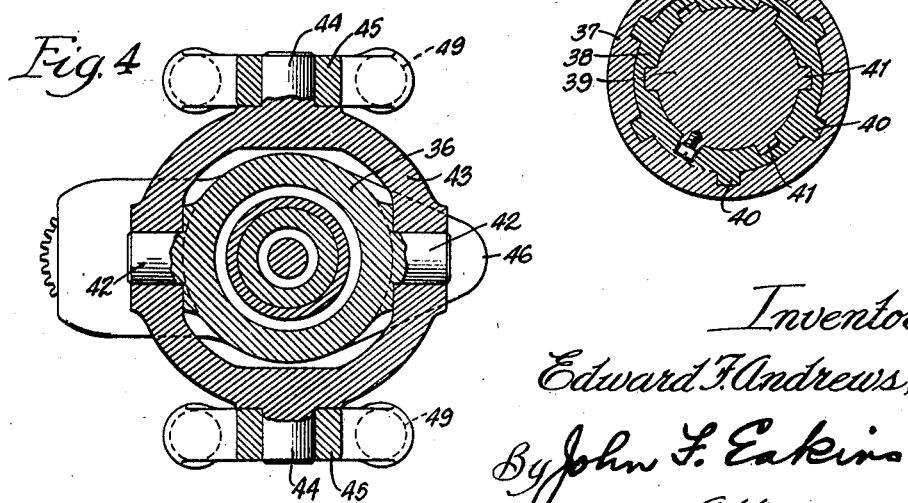
Inventor:
Edward F. Andrews,
By John F. Eakins
Atty.

Oct. 5, 1943.  E. F. ANDREWS  2,330,803
AIRCRAFT
Filed June 14, 1937  7 Sheets-Sheet 2

Inventor:
Edward F. Andrews,
By John F. Eakins
Atty.

Oct. 5, 1943. E. F. ANDREWS 2,330,803
AIRCRAFT
Filed June 14, 1937 7 Sheets-Sheet 3

Inventor:
Edward F. Andrews,
By John F. Eakins
Atty.

Oct. 5, 1943. E. F. ANDREWS 2,330,803
AIRCRAFT
Filed June 14, 1937 7 Sheets-Sheet 4
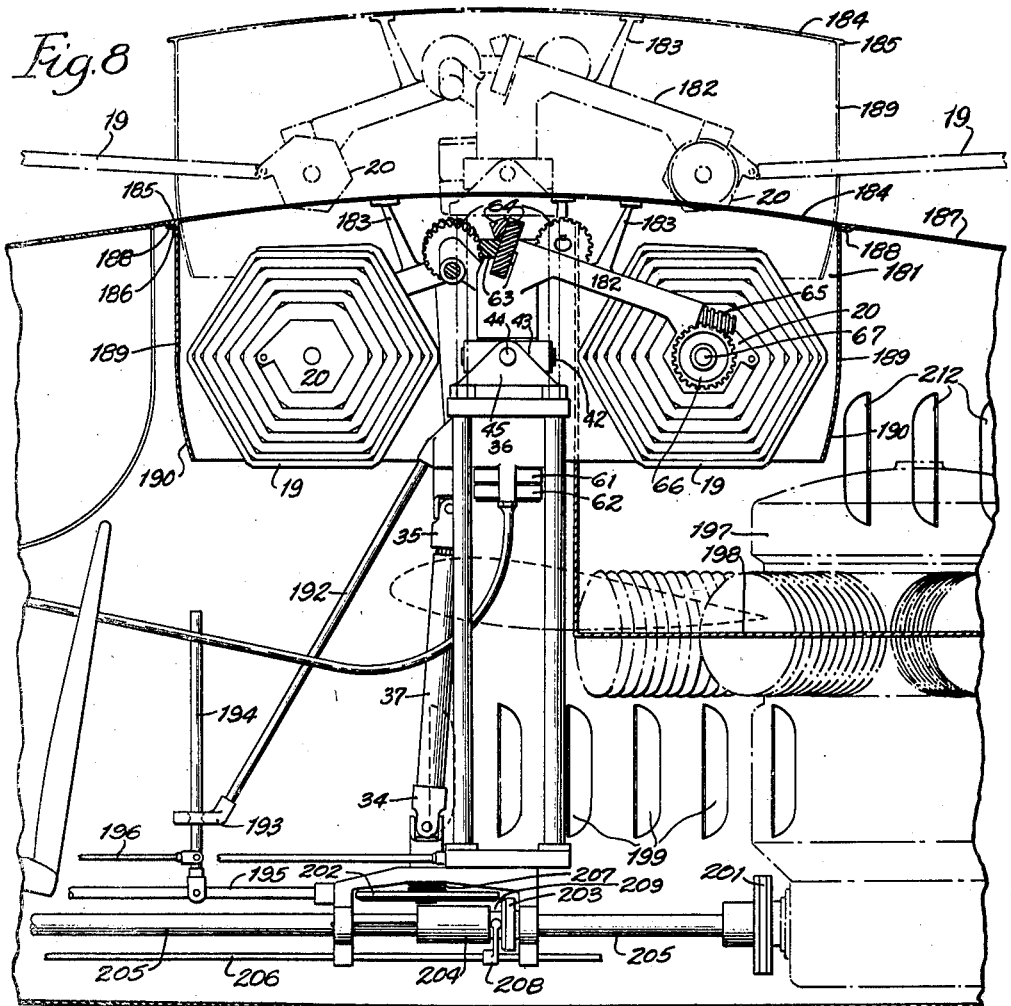
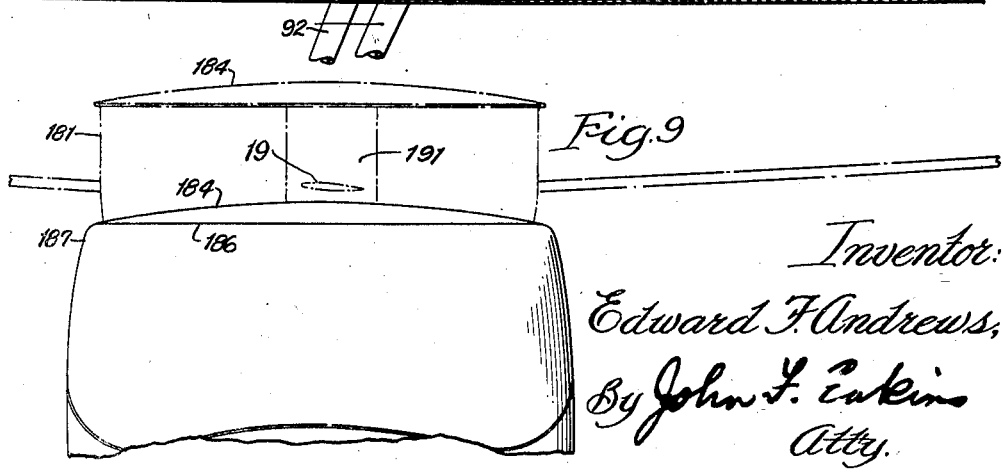
Inventor:
Edward F. Andrews,
By John F. Eakins
Atty.

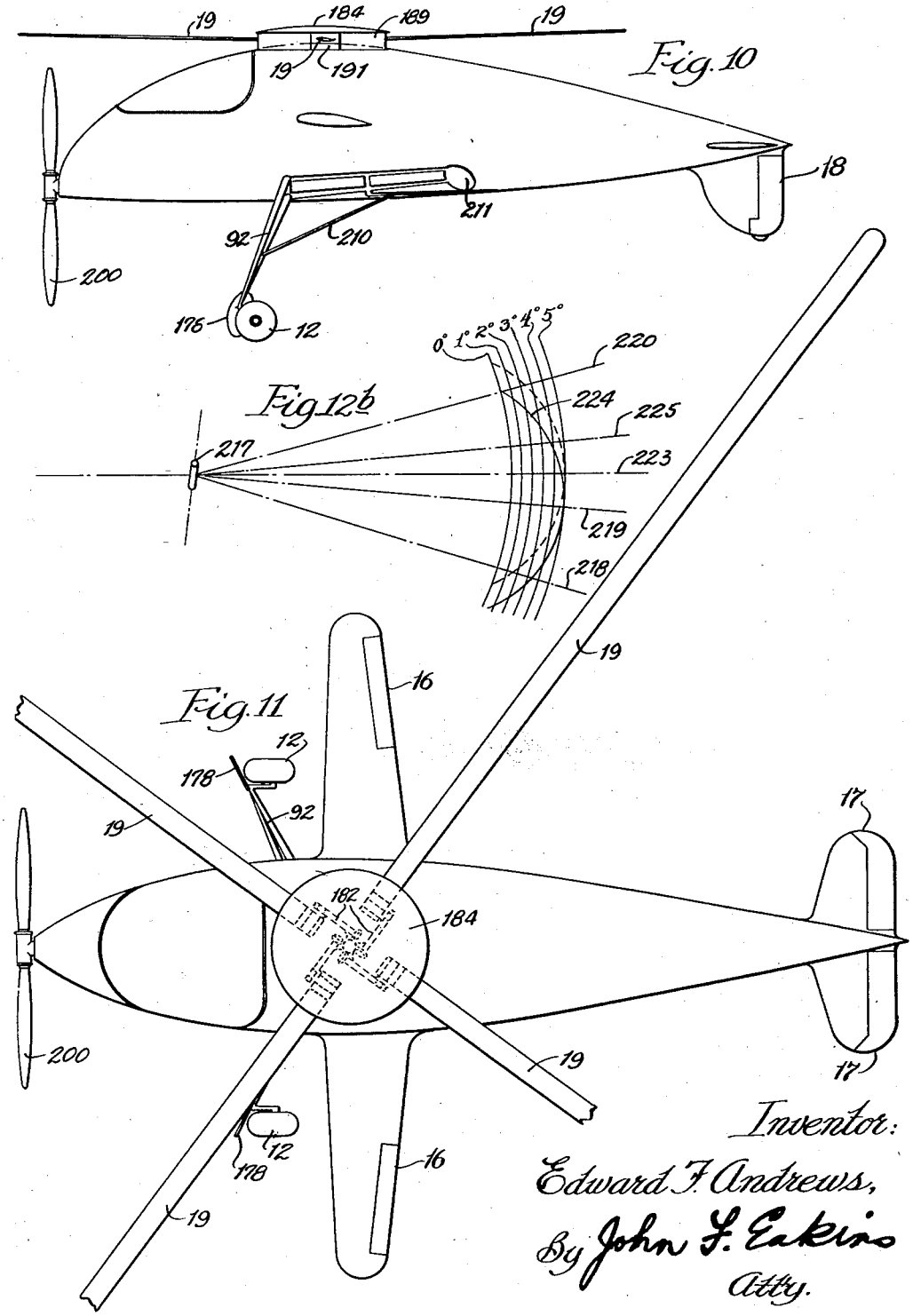

Oct. 5, 1943.　　　　E. F. ANDREWS　　　　2,330,803
AIRCRAFT
Filed June 14, 1937　　　7 Sheets-Sheet 6
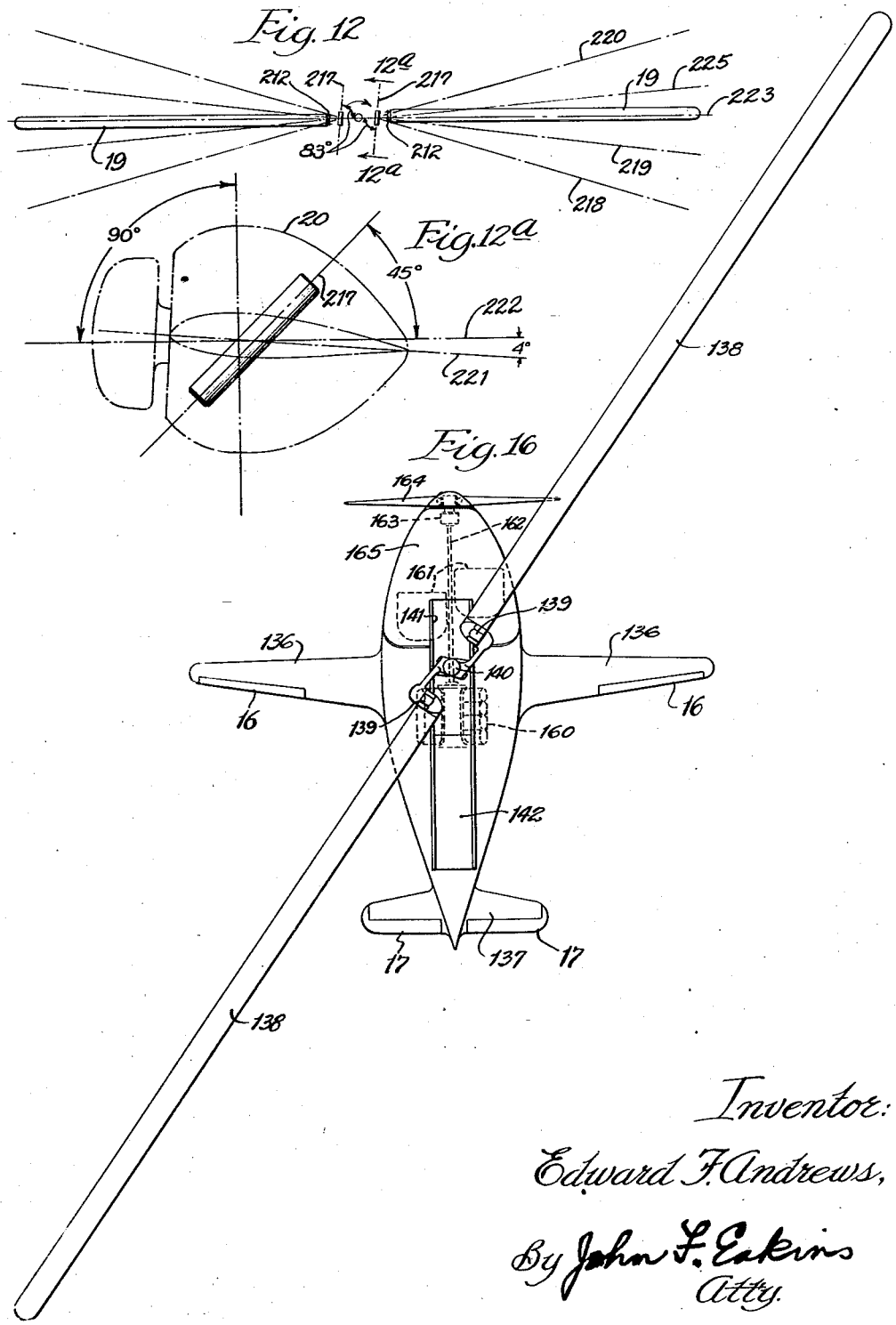

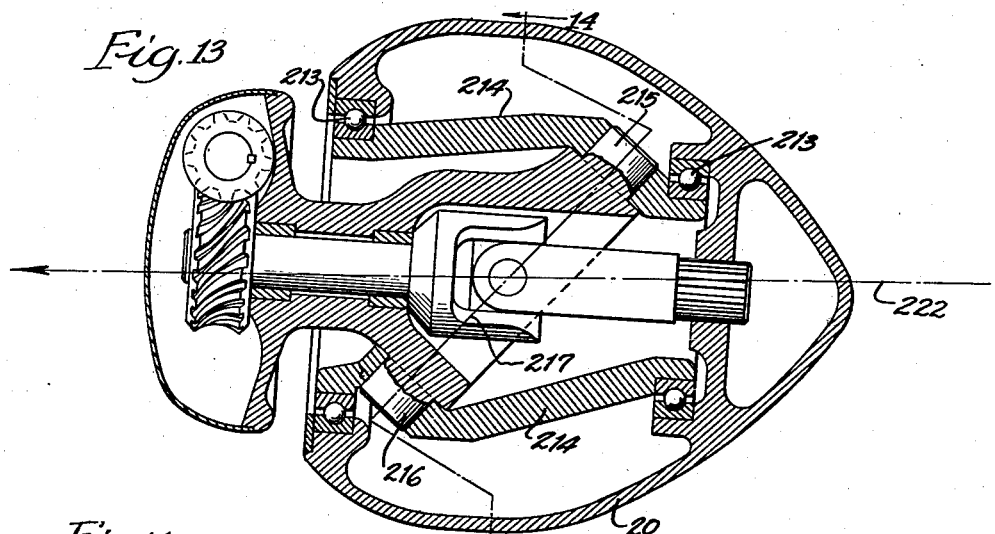
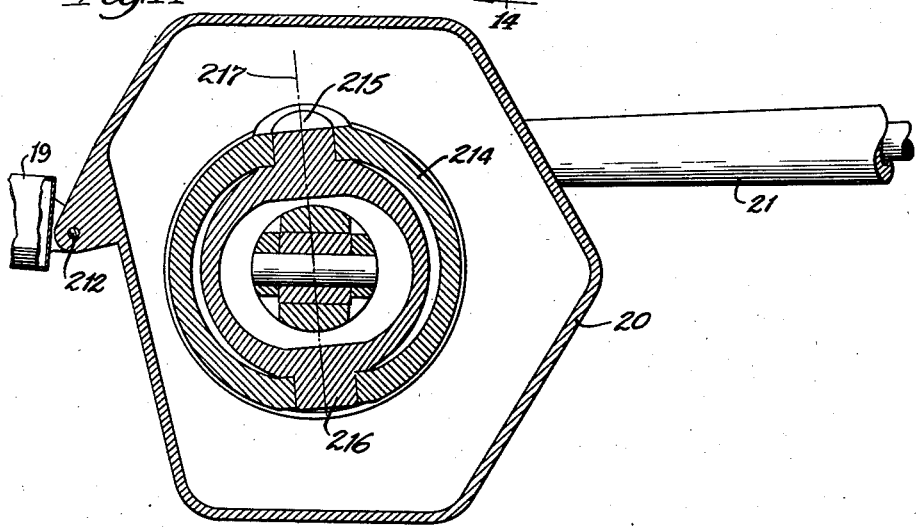
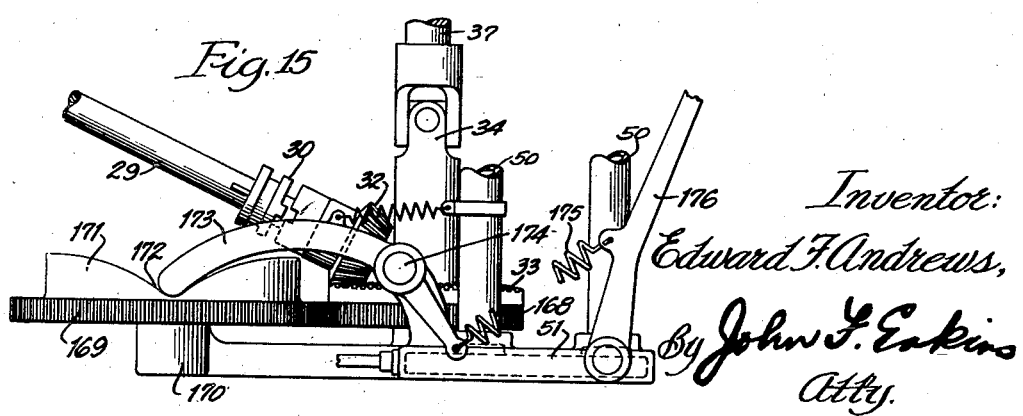

Patented Oct. 5, 1943

2,330,803

UNITED STATES PATENT OFFICE 2,330,803

AIRCRAFT

Edward F. Andrews, Chicago, Ill.

Application June 14, 1937, Serial No. 148,085

12 Claims. (Cl. 244—7)

This invention relates to aircraft with lifting surfaces of widely variable span and area and has for its principal object the provision of a new and improved aircraft capable of efficient flight at very high speed and having a very wide range of speed and performance.

Fixed wing aircraft heretofore built have had supporting surfaces the areas of which are determined by the low takeoff and landing speeds required by considerations of safety. Thus the landing speed of an aeroplane to operate from oridnary fields or water surfaces should not exceed 60 or 70 miles per hour. Higher landing speeds are only employed by special racing aeroplanes for which special piloting and landing conditions are provided, and in which safety is definitely sacrificed.

The supporting surface necessary even for these high takeoff and landing speeds is excessive for high speed flight, during which it sets up a wing surface resistance which is often the largest single element of the total drag and seriously limits the maximum speed attainable with a given power.

In addition to this, the present type of aircraft with invariable supporting area, has a relatively small ratio between its maximum and minimum speed, known as the speed range. The low end of the speed range is established by the low speeds necessary for safe landing and takeoff. Therefore unless the speed range can be increased, there is a definite limit to which the high speed can be increased without also increasing the landing speed. Thus the necessity of increasing the speed range if an aircraft is to attain very high speed flight becomes apparent.

Very few aeroplanes have had a speed range higher than 3 to 1. Some autogiros may approach 5 to 1, but this has been accomplished by reducing the low speeds. However, the rotating wing system whereby these low speeds are attained constitute a decided limitation to the maximum speed attainable.

According to my invention I provide an aircraft having a small area fixed wing of high incidence specifically adapted for high speed flight without any consideration of the requirements of takeoff and landing. This aircraft is also provided with an auxiliary rotating wing supporting system which can be completely retracted into the aircraft when the speed of flight is to be increased, and which can be again extended into operating condition for landing, takeoff or other flight conditions at low dynamic pressure, that is, flight at low speeds or high altitudes.

The rotating wing, when fully extended has a span or diameter considerably greater than the span of the fixed wing, and also a disc area which is much greater than the area of the fixed wing.

The rotating wing supporting system may be arranged for operation as a helicopter or as an autogiro. A helicopter is regarded as a power driven rotating wing system which creates a flow of air downwardly through the disc swept by its blades and is capable of sustention without forward motion, while an autogiro is regarded as a rotating wing system normally driven entirely by air forces resulting from a flow of air upwardly through the disc swept by its blades. I prefer to use a rotating wing system which is normally power driven at a speed of rotation which avoids the flow of air through the swept disc in either direction, or at least reduces any flow to small proportions, which will not produce an excessive torque reaction, which can not be overcome by the controls. Operated in this distinctive manner, my rotating supporting system is therefore substantially similar to a solid circular aerofoil of the area of the disc swept by the rotating blades. Thus operated, my rotating wing is neither a propeller nor a windmill, but a deflecting aerofoil producing lift from forward speed, the lift coefficient of which can be varied somewhat above or below that of a solid surface by the direct application and variation of relatively small motor power.

In this way, an extremely large equivalent supporting surface is obtained having a larger span than that provided by the small area fixed wing and in every way ideally adapted to the conditions of low speed flight. At low speeds the rotating wing canot stall and go into a spin and can be made perfectly controllable down to very low forward speeds by mounting it on the aircraft so that its axis of rotation may be inclined in any direction at the will of the operator. If the diameter of the rotating wing is made large, compared to the weight carried, very low forward speed and sinking speed can be attained, whereby landings in rough or restricted areas, or in fog, may be made quite safely. The span or diameter of the rotating wing may be made large without excessive weight as the bending of the blades due to the lift can be balanced by centrifugal force and although torsionally stiff, they can be made yielding in the direction of their thickness so that they can be coiled up while they are rotating.

For purposes of takeoff the power of the motor may be applied directly to the rotating wing. Power may be stored in the rotating wing by causing it to rotate above normal speed, and this power, with or without further power from the motor, may be used to secure takeoff without forward motion or with very low forward speeds.

In ordinary aeroplanes with fixed wing area the smal range of speed is attained by varying the angle of attack of the wing and thereby varying its lift coefficient. However, owing to the fact that the speed range attained is proportional to the square root of the ratio of the maximum to minimum lift coefficient, only a small speed range can be obtained without reducing the minimum lift coefficient employed during high speed flight to a very low value. Therefore, to attain even the limited speed range of conventional aeroplanes the wing area must be relatively large, even at high speed. As the friction drag of a wing is a function of the area exposed to the air stream, this component of the drag, which is very large at high speed, makes large area wings at low angles of incidence, as used in conventional aeroplanes, very inefficient for high speed flight.

In my invention I employ only a limited variation of the angles of incidence and lift coefficient to vary the speed, never reducing the angle of incidence and the high speed lift coefficient below a relatively high value. The unprecedented speed range made possible by this invention is obtained mainly by employing a much larger effective wing area for low speed flight than is employed for high speed flight.

The area of the fixed wing of my aircraft is not determined by the large areas required for landing and takeoff, but by the area required for high speed flight at the most efficient angle of incidence and with the highest aspect ratio that can be practically employed.

The maximum lift coefficient of the rotating wing is attained by suitable inclination of the disc swept by its blade to the direction of flight and may be considered as unity, with the motor disconnected from the wing. If the rotating wing is driven directly by the motor its lift coefficient may be considerably increased.

My fixed wing operates at higher high speed lift coefficient, higher angles of incidence, and carries wing loadings very much greater than prior airplanes at comparable speeds. My fixed wing may be constructed to carry wing loadings of 300 pounds per square foot or more, based on the gross weight of the aircraft at very high speed, but the wing loading of aircraft embodying this invention at lower speeds will of course be less. I also prefer to use a wing section relatively thick in terms of the chord to obtain a higher aspect ratio with a given thickness of the wing.

I attain excellent low speed performance without additional resistance at high speed by completely retracting the rotating wing during high speed flight. When completely retracted within the fuselage, only the weight of the rotating wing affects the high speed performance of the aircraft. The influence of the weight is small because at high speed little power is required to sustain the extra weight. My invention also provides two separate systems of sustention and control, each capable of supporting and controlling the aircraft independently of the other. Furthermore, as the rotating wing is employed only at low speeds, the disadvantages and difficulties of rotating supporting surfaces at high forward speeds are completely avoided.

It is essential to this invention that a rotating wing be provided capable of retraction and extension during flight. Rotating wings which can be made of large span without excessive weight, that are yieldable and non-resonant, but still torsionally rigid, and which can be wound into coils while rotating, such as those shown in the copending application of Theodore Theodorsen and Edward F. Andrews, Serial No. 112,888, filed November 27, 1936 (Patent No. 2,172,334, granted September 5, 1939), are particularly suited for this invention. I prefer a rotating wing capable of gradual extension or retraction so that sudden and violent fluctuation of the air forces may be avoided during the transition from one mode of flight to the other. Wings of the type above referred to can be wound in gradually while still rotating and the effective area reduced slowly enough to allow the aircraft to attain the higher speed necessary for support by the fixed wing alone. During the reverse process, the rotating wing is gradually extended so that time is available for it to acquire its normal speed of rotation as well as for the aircraft to pass from the higher to the lower speed.

Especially when very high speeds are attained, means may be provided for shielding the rotating wings from the air stream while they are being wound and unwound. Any sudden changes in the resistance of the rotating structure while being retracted or extended should also be avoided. This can be accomplished by completely or partially housing the hub of the rotating wing structure and/or the drums upon which the wings are wound, and by gradually extending or retracting the rotating wing structure as the wings are unwound or wound.

The advantages of this invention become greater as the speed desired becomes higher. This is partly because a larger speed range is required to attain safe landing speeds as the maximum speed increases and partly because the reduction of the drag resulting from reduction of the supporting area is greater at high speed. The advantages of this invention in reducing the wing drag also have a much larger effect when the parasite drag of the rest of the aircraft is low. Therefore a fuselage of very good streamline form together with retractible alighting gear and all practical means of reducing parasite resistance are employed. Sharp breaks in the contour of the fuselage are avoided and visibility is secured by making the smooth streamline surface of the fuselage of transparent material. This visibility may be enhanced by locating the pilot in the front of the fuselage. The control surfaces are made smaller than usual to give low drag under high speed conditions and the rotating wing should have differential blade angle control or should be mounted with an adjustable axis so that it may be suitably inclined at will to provide the main lateral and longitudinal control at low speeds.

Means are provided whereby power can be applied to the rotating wing to bring it up to proper speed for direct takeoff or takeoff with a very short run and to overcome the profile drag of its rotating blades as far as possible without excessive torque reaction during steady flight and for improving its low speed and climbing efficiency.

It will thus be seen that a novel and highly improved aircraft is provided by this invention capable of enormous variation of its effective lifting surface and great increases in speed range and high speed efficiency.

Certain features of the instant disclosure, notably a retractable landing gear arrangement and shock absorbing means, are disclosed and claimed in my co-pending application Serial No. 498,286, filed August 12, 1943, which is in part a division and continuation-in-part of the instant application.

The invention will be more fully understood from the following description of preferred embodiments thereof taken in conjunction with the accompanying drawings, in which Fig. 1 is a plan view of an aircraft embodying my invention, certain parts thereof being broken away.

Fig. 4 is a cross-sectional detail view, taken on the line 4—4 of Fig. 3 and on a larger scale.

Fig. 5 is a cross-sectional detail view taken on the line 5—5 of Fig. 3 and on a larger scale.

Fig. 8 is a sectional view of an aircraft embodying my invention and provided with a turret for housing the rotating wing.

Fig. 9 is a front elevational diagrammatic detail showing the relation of the turret to the fuselage.

Fig. 10 is an elevational view, on a small scale, of an aircraft in which the rotating blades are partly extended and the turret partly elevated.

Fig. 11 is a plan view of this aircraft.

Fig. 12 is a diagrammatic view of the wing indicating the manner in which the angle of incidence may alter with the displacement of the blade from the radial position.

Fig. 12a is a diagrammatic section taken on the line A—A of Fig. 12 showing the relative position of the drum and the wing section dotted in.

Fig. 12b is a diagrammatic view of the wing similar to Fig. 12, but showing the curve of the angle of incidence change against blade displacement.

Fig. 13 is a longitudinal section through a drum adapted for this manner of blade control.

Fig. 14 is a transverse sectional view therethrough, the section being taken on the broken line 14—14 of Fig. 13.

Fig. 15 is a fragmentary detail of the mechanism for driving the rotary structure and for arresting it in registry with the compartment in the fuselage in which it is housed, and Fig. 16 is a plan view of an aircraft embodying my invention, the parameters of the wings being adapted for very high speed range.

Figure 3:
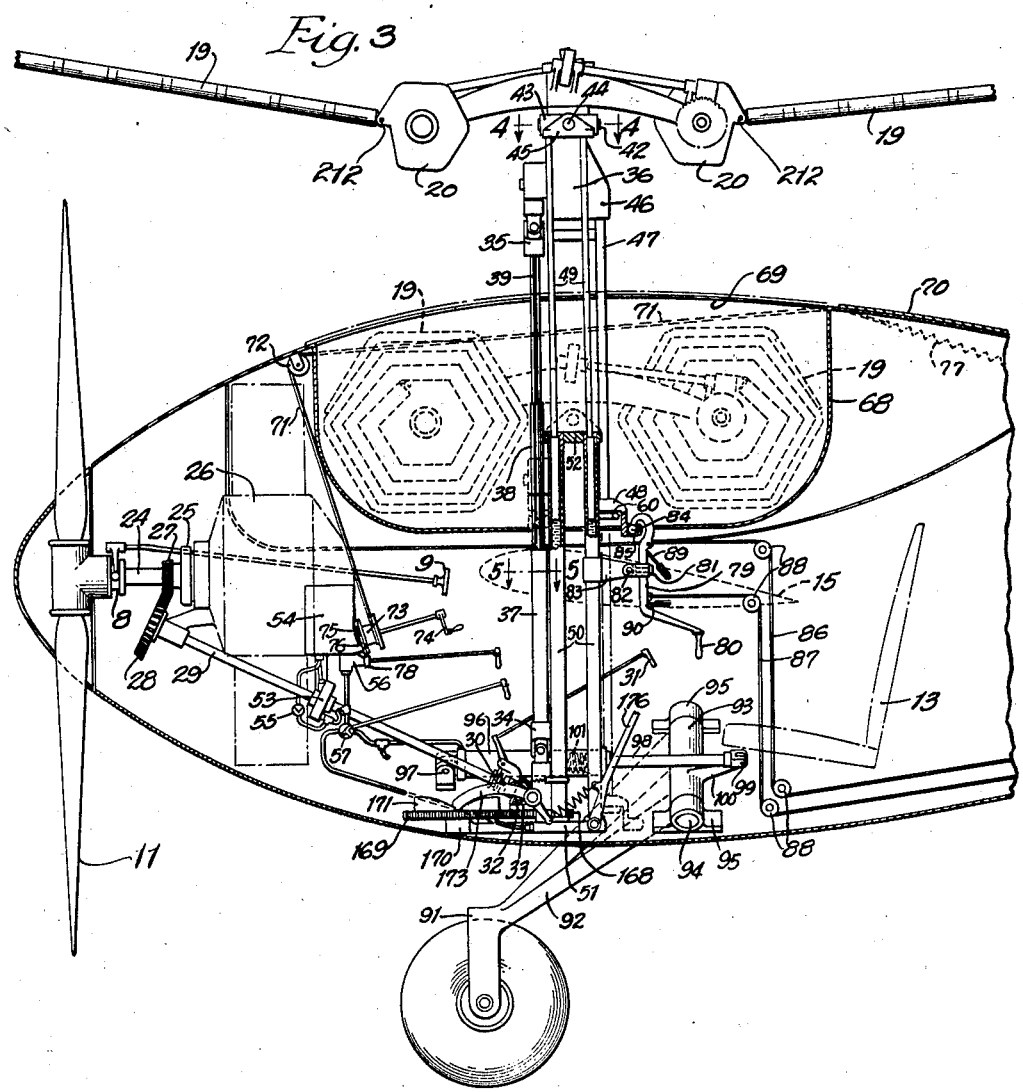
Fig. 3 is a longitudinal section of the forward end of the aircraft showing the rotor in operating position.
Figure 2:
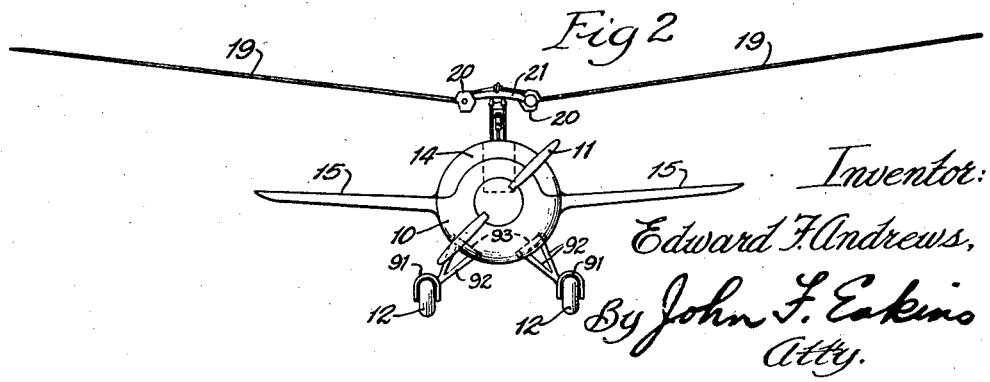
Fig. 2 is a front elevation thereof on a smaller scale showing the complete aircraft.

Referring to the drawings and more particularly to Figs. 1, 2, 3, and 7, the aircraft consists of a thoroughly streamlined fuselage 10, with a propeller 11, preferably of the variable pitch type, at its forward end, and retractable landing wheels 12. The propeller pitch control mechanism 8 is operated by a control handle 9. Seats 13 are provided for an operator and passenger, and to obtain visibility a section of the fuselage covering 14 is constructed of a transparent material. A fixed wing 15 is attached to the fuselage. This wing is designed for sustaining the aircraft at high speeds and has a small area and a relatively high angle of attack. The wing is provided with ailerons 16 for lateral control. The rear end of the fuselage 10 carries horizontal control surfaces 17 and vertical control surfaces 18. These control surfaces are of such dimensions as to provide proper control of the aircraft with minimum drag at the high speeds at which wing 15 is designed to operate.

Takeoff, landing, and flight at low dynamic pressures are accomplished by means of the large diameter rotating wings 19. The wings 19 are attached to polygonal drums 20 around which they may be coiled. The drums 20 are carried on arms 21 projecting from a hub 22 which is rotatably mounted on a stationary casing 36. The rotor is driven from the propeller shaft 24. An over-running clutch 25 is preferably inserted between the engine 26 and the propeller shaft 24 so that the engine can drive the propeller shaft 24, but the propeller shaft continues to rotate if the engine stops. A pinion 27 carried by the shaft 24 meshes with a gear 28 carried by one end of a shaft 29. The other end of shaft 29 carries a clutch 30, operable by a handle 31 within reach of the operator, which engages or disengages shaft 29 from a pinion 32. The pinion 32 meshes with a gear 33 carried on the lower end of a universal joint 34. Another universal joint 35 transfers the motor torque to the hub 22 through pinion 23 and gear mechanism (not shown) within the stationary casing 36 of the rotor. This gear mechanism and in fact the whole hub and rotating wing structure may suitably be similar to that described and illustrated in the previously referred to Theodorsen and Andrews Patent No. 2,172,334. The universal joints 34 and 35 are connected by a telescoping drive shaft composed of three sections, 37, 38, and 39. One end of section 37 of the shaft is secured to the universal joint 34. The section 38 slides within section 37 and, on its outer surface, carries splines 40 which engage in slots in the inner surface of the section 37. The upper section 39 of the driveshaft is secured to the universal joint 35 at its upper end and telescopes into section 38. The outer surface of section 39 carries splines 41 which operate in slots in the inner surface of the section 38. This construction is best seen in Fig. 5. The section 38 may be connected to the section 39 by means of a pin and slot or other suitable means providing limited sliding engagement. The purpose of this construction will become evident when the operation of the device is further described.

The hub casing 36 is universally mounted so that the axis of rotation of the rotating wing may be inclined in any desired direction for purposes of aircraft control during the operation of the rotating wing. As shown in Figs. 3 and 4, the hub casing 36 carries pins 42 which operate in bearings in a ring member 43. This permits the axis of the rotating wing to be tilted in a plane transverse relative to the aircraft. The ring member 43 carries pins 44 which are at right angles to the pins 42 and are pivotally mounted in bearing members 45 adjustably carried by the aircraft as will be later described. The pivot pins 44 permit the hub casing 37 and the axis of the rotating wing to be tilted fore and aft relative to the aircraft.

The casing 36 carries a formation 46 within which is rigidly mounted a tube 47, which projects downwardly. At its lower end the tube 47 carries a bracket 48 whereby it may be actuated.

The bearing members 45 are mounted on vertical downwardly projecting rods 49 which carry pistons operating in cylinders 50. At their lower ends the cylinders 50 are rigidly connected to a header 51 which is rigidly mounted on the body of the aircraft. At their upper ends the cylinders 50 are joined together by horizontal brackets 52 which may be secured to the fuselage.

A pump 53 is continuously driven by the shaft 29. The inlet of the pump is connected to a reservoir 54. The outlet of the pump is connected to the reservoir through an automatic pressure relief valve 55 and through a manually operable valve 56. The outlet of the pump is also connected through a three way valve 57 to the header 51 of the cylinders 50 and to the cylinders 96 which are operated by pressure fluid to project the wheels 12 into operating position. The relief valve 55 is set for a sufficiently high pressure to insure the operations of projecting the rotating wing structure upwardly and projecting the wheels 12 when desired.

The valve 57 has four positions. It may connect the outlet of the pump to the cylinders 50 and the cylinders 96. It may connect the outlet of the pump to the cylinders 50 or to the cylinders 96, and it may be set to prevent communication between the outlet of the pump, the cylinders 50, and the cylinders 96. When the valve 56 is opened and the valve 57 is set for communication of the outlet of the pump to either or both of the cylinders 50 and 96, the oil in the cylinders is caused to return to the reservoir 54. This return is caused by the weight of the rotating system and by the springs in the cylinders 96. When the valve 56 is closed oil under pressure may be supplied to the cylinders 50 or the cylinders 96 or both the cylinders 50 and 96 by suitably positioning the valve 57. When either the rotating system or the wheels 12 or both have been projected they may be maintained in that condition by simply moving the valve 57 to a position in which it cuts off communication between the associated cylinders and the reservoir 54.

The rotor blades 19 are wound up on, or wound from, the drums 20 by rotating the hand wheel 60 carried at the lower end of the tube 47. The hand wheel 60 operates the brake band 62 to wind in the wings when turned in one direction and the brake band 61 for extending the wings when turned in the opposite direction. The construction and operation of this mechanism is fully described and illustrated in the previously referred to Theodorsen and Andrews patent. A central helical gear 63, meshing with helical gears 64 rotates the drums 20 by means of helical gears 65 meshing with helical gears 66 mounted on shafts 67.

The gear 33 is integral with a gear 168 which meshes with a large gear 169, rotatably mounted in a fixed bearing 170. The ratio between gears 168 and 169 is such that the latter rotates at the same rate as the rotary structure. The gear 169 is provided with cylindrical cam members 171 which define two diametrically opposite valleys 172. One end of a lever 173 which is pivotally mounted at 174 bears against the cam members 171. The opposite end of the lever 173 is connected by a spring 175 to a lever 176. After the wings are wound up on the drums 20, the lever 176 is pulled rearwardly and the lever 173 is thereby applied with yieldable force to the cam members 171 and serves as a detent and brake, finally bringing the rotary structure to rest with the lever 173 located in one of the valleys 172. These valleys are correlated with the rotary structure so that the latter is arrested with the drums 20 in fore and aft relation so that the wound up rotary structure is in alignment with chamber 68.

To retract the rotating wing into the fuselage, the handwheel 60 is rotated in the proper direction to cause the wings 19 to coil up on the drums 20. When the wings are entirely coiled up the clutch 30 is disengaged and the rotor is stopped in the manner above described. The valve is then operated to release the oil pressure within the tubes 50. Thereupon, the rotor will descend into the fuselage by its own weight, the rods 49 telescoping into the cylinders 50, section 38 of the drive shaft telescoping into section 37, and section 39 into section 38. The rotor will then occupy the position in the fuselage shown in dotted lines in Fig. 3.

It should be noted that, in the event of engine failure, the presence of the over-running clutch 25 enables the propeller 11 to be driven by air forces and thus drive the shaft 29 to project the rotor from the fuselage, initiate its rotation, and unwind the wings 19 from the drums.

As will be seen, the retracted rotor occupies a position in the fuselage in front of and between the lines of forward sight of the two passengers, with the greatest dimension of the rotor system from front to rear and the smallest dimension from side to side. Each passenger is thus provided with visibility forward and sidewise. The rotor is housed within a compartment 68 in the fuselage. The compartment 68 may be constructed of transparent material to provide increased visibility during takeoff and landing, at which times the rotor is in elevated position.

The opening 69 in the top of the fuselage through which the rotor is projected from or retracted into the compartment 68 is closed by a sliding panel 70 when the rotor is in the retracted position. Two cables 71, connected to the forward end of the panel 70, pass over pulleys 72 and wind up on a drum 73 operated by a crank 74. A ratchet 75 is carried on one flange of drum 73 and is engaged by a pawl 76. A spring 77 is connected to the rear of the panel 70 and anchored to the rear of the fuselage, and tends to hold the panel 70 in its rearward position. When the rotor is retracted, the crank 74 is operated to wind up the cables 72 on the drum 73 sliding the panel 70 over the opening 69 against the tension of the spring 77. When the opening 69 is completely closed the crank 74 is released by the operator, and pawl 76, in engagement with ratchet 75, holds the drum 73 against rotation in the reverse direction. A cam 78 adapted to engage pawl 76 is operated by the valve handle simultaneously with the valve 56. Thus, when the operator turns the valve 56 into position to elevate the rotor, the cam 78 engages pawl 76, releasing it from engagement with ratchet 75. The spring 77 pulls back panel 70 to uncover the opening 69 and the rotor rises into projected position.

For purposes of rolling and pitching control I provide a control lever 79 with a handle 80 within convenient reach of the operator. The control lever 79 is free to move in any direction and is pivoted on pins 81 and 82 to a bracket 83 carried by two of the vertical tubes 50. At its upper end, above the pivot pins 81 and 82, the lever 79 curves forward and downwardly, and its end carries a ball engagement with control lever 79, the ball 84 being within a hole 85 in the member 48. It will be seen that a movement of the handle 80 in any direction will cause the axis of rotation of the rotor to be inclined in the opposite direction. Because of the universal joints 34 and 35, and the telescoping drive shaft connecting them, the axis of rotation of the rotor may be inclined in any direction without affecting the drive from the engine.

When the rotor is retracted the engaging member 48 also descends away from the ball 84 on lever 79. In this condition the lever 79 is free to be moved without affecting the retracted rotor and is then used for control in high speed flight. Cables 86 and 87 pass over pulleys 88 and are attached to the elevators 17. Cables 89 and 90 are connected to lever 79 in a similar manner and to the ailerons 16. Thus a movement of the handle 80 will produce a movement of either the elevators 17 or ailerons 16, or both. When the rotor is not in use the lever 79 operates the elevators and ailerons for high speed flight control. These are small and of low drag and, though adequate for high speed flight, are insufficient by themselves for satisfactory control at low speeds. When the rotor is in operation, the lever 79 operates the ailerons and elevators and, in addition, tilts the axis of rotation of the rotating system in desired direction to provide additional control at the low speeds.

Figure 7:
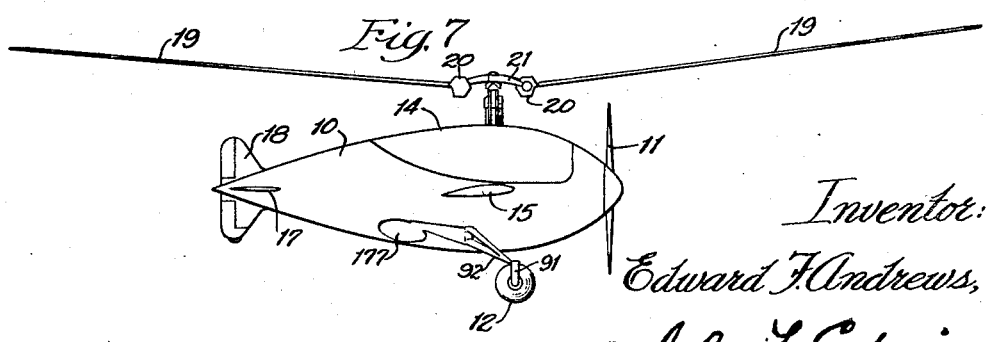
Fig. 7 is a side elevation of Fig. 2 showing the comparative dimensions of the rotating wing blades and the body of the aircraft.

For high speed flight it is desirable to reduce the drag to a minimum. Therefore, the landing wheels 12 are made retractable into the fuselage. The wheels 12 are carried in yokes 91. The yokes 91 are carried by arms 92 from a bearing member 93 rotatably mounted on a shaft 94. The shaft 94 is attached to the fuselage by means of blocks 95. At best seen in Figs. 2 and 3, the shaft 94 is so positioned in the fuselage that the landing wheels 12 swing backwardly and inwardly into the fuselage behind the passengers so as to remove all drag associated with the alighting gear. The retracted position of the wheels is shown in dotted lines in Fig. 1. In Fig. 7 the recesses 177 in the body into which the wheels 12 retract are shown. These recesses may be covered by structure for this purpose attached to the members 91 and 92.

The cylinder 96 which operates the wheel 12 is pivotally attached to the fuselage by a pin 97. A plunger which operates within the cylinder 96 carries a rod 98 which is connected, by means of a pin 99, to an arm 100 projecting from the bearing member 93 and integral therewith. A compression spring 101 within the cylinder 96 tends to move the rod 98 to the left, as viewed in Fig. 3, and normally keeps the wheel 12 within the fuselage in retracted position.

The wheels 12 and the rotor system can be both projected and retracted simultaneously or the wheels can be retracted while the rotating wing is in operation, to eliminate the drag occasioned by the landing gear when continued low speed flight is desired. Also, the rotating system can be projected and put into operation without projecting the wheels which may be projected any time thereafter.

Figure 6:
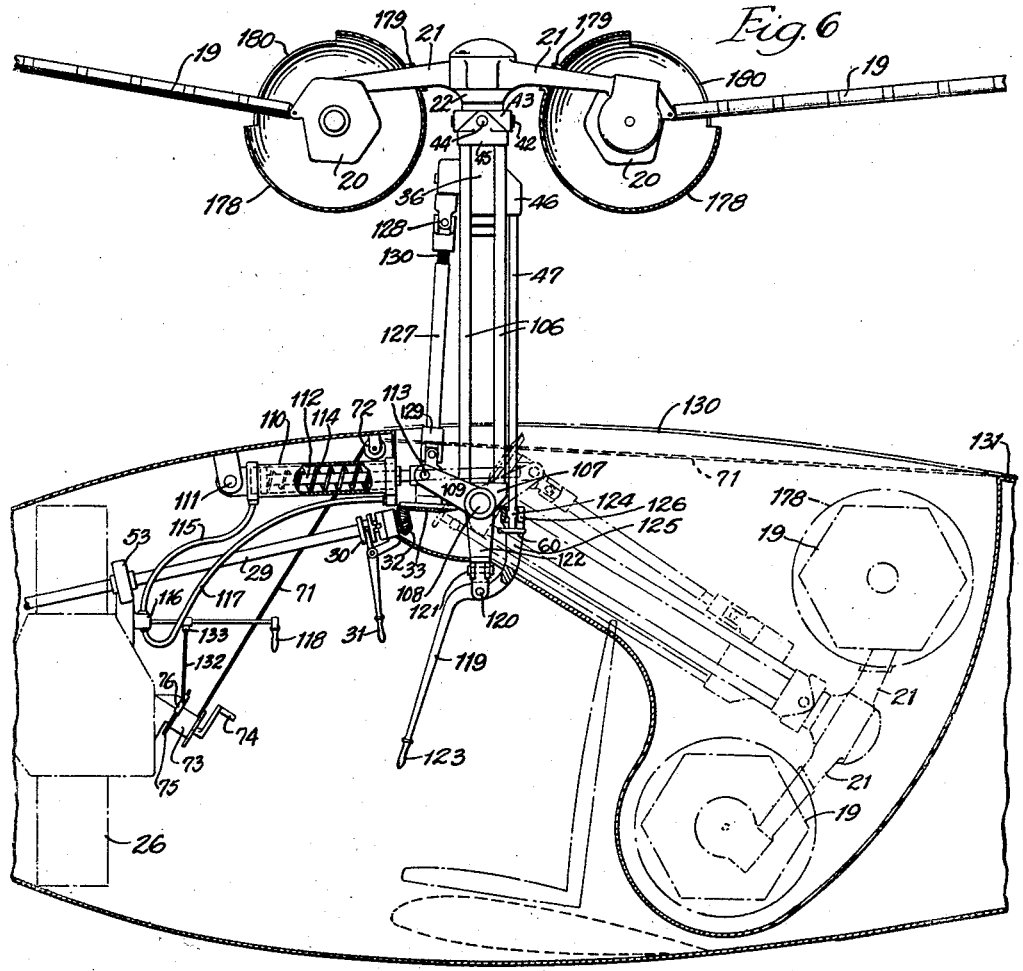
Fig. 6 is a longitudinal section through a part of an aircraft showing a further embodiment of my invention applied thereto, including spherical shields around the drums.

Fig. 6 illustrates a further embodiment of this invention. In this embodiment, the rotating wing system is carried on the fuselage by upright rods 106 of which the lower ends are mounted on a base 107. The base 107 is rotatably mounted on a shaft 108 affixed to the fuselage. An arm 109 is rigidly attached to the bearing member 107. A hydraulic cylinder 110 which is pivotally attached to the fuselage by a pin 111 contains a plunger which is connected to the arm 109 by means of a pin 113. A compression spring 114 within the cylinder 110 bears against the end of the cylinder and urges the plunger 112 to the left as viewed in Fig. 6. The plunger 112 acts on the arm 109 to raise the rotating wing system to its upright position as seen in full lines in Fig. 6. A pipe 115 connects one end of the cylinder 110 to one side of the valve 116. A pipe 117 connects the other end of the cylinder to the opposite side of the valve 116. The valve 116 is operated by the handle 118. Oil pressure from pump 53 may be supplied to either one side or the other of cylinder 110 by movement of the valve handle 118 in the proper direction. By operation of the by-pass valve 116 by the handle 118 the oil pressure may be released from either side of the cylinder 110 when it is desired to cause the plunger 112 to travel in the opposite direction. Normally the spring 114 raises the rotating system to the operating position, but oil pressure through the pipe 117 may be used to raise the rotor system.

The axis of the rotating wing system may be inclined in any direction desired in a manner similar to that of the first described embodiment of the invention. A lever 119 is universally pivoted, by means of pivot pins 120 and 121, at the lower end of a bracket 122 rigidly carried on the shaft 108. The lower end of the lever 119 carries a handle 123, and its upper end is formed to engage a spherical portion 124 near the lower end of the tube 47. The upper end of the lever 119 is forked at 125 to provide space for the hand wheel 60 and is also slotted at 126 to permit disengagement of the spherical portion 124 carried by the tube 47 from the lever 119 when the rotor is being tilted backward to the retracted position. Power may be supplied to the rotor by a drive shaft 127 which connects the universal joints 128 and 129. The shaft 127 is splined at one end, 130, to the universal joint 128 without disturbing the drive when the rotor is tilted in any desired direction by operation of handle 123.

When the valve 116 is turned to admit oil under pressure through line 115 to the front end of the cylinder 110, after the wings 19 are coiled on the drums 20 and the rotor has ceased to rotate, the rotor assembly will be rocked around the shaft 108 by the plunger 112 operating the arm 109. In its fully retracted position the rotor assembly will assume the position in the fuselage shown in dotted lines, Fig. 6, and the bevel gear 33 becomes disengaged from bevel pinion 32. Also, the spherical portion 124 on the tube 47 becomes disconnected from the upper end of the control lever arm 119. After the rotor is retracted the crank 74 is operated to close the opening 130 in the top of the fuselage by a sliding panel 131, in the same manner as described in the previous embodiment of this invention.

The pawl 76 in this case is operated by a cable 132 which is connected to the pawl and to an arm 133 carried on and operated by movement of the handle 118. When the handle 118 is operated to raise the rotor system, the pawl 76 is released from engagement with the ratchet 75 on the drum 73 and the panel 131 is drawn back by a spring (not shown), to uncover the opening 130 in the top of the fuselage. When the handle 118 is put into proper position to retract the rotor system the pawl 76 is permitted to engage the ratchet 75. After the rotor is completely retracted the panel 131 is moved back into position by operating crank 74 to wind up the cables 71 on the drum 73.

It should be noted that the spring 114 within the cylinder 110 is of sufficient strength to raise the rotor and hold it in operating position.

The rotor assembly in this embodiment of the invention is similar to that shown in Fig. 3 except that the gears and shafts for rotating the drums to coil up or unwind the wings are completely enclosed, as are also the wing drums 20. During the transition from high speed to low speed flight or vice versa, it is important to prevent excessive air forces from acting upon the wings 19 and drums 20 during the process of retracting or projecting the rotating wing system. The wings 19 have considerable inertia and should not be extended or retracted too rapidly during their rotation. Therefore the process of putting the rotating wing system into operation or retracting it from the operating position requires an appreciable time. As the air speed at the beginning of the extending operation is quite high, as well as at the end of the retracting operation, the air forces acting upon the winding up or unwinding wing are considerable.

For the purpose of reducing the fluctuation of the air forces, as the rotating system revolves and for protecting the partially or fully wound up wing from direct exposure to these air forces, spherical metal enclosures 173 are attached to the arms 21 and completely surround the drums 20 and the portion of the wings 19 wound thereon. These enclosures 178 are constructed with sufficient strength to withstand the maximum air forces encountered and are securely attached to the arms 21 at 179 and also, if desired, to extensions from the axis of the drums. Each enclosure 178 is provided with a slot 180 through which the wing 19 may be extended. This slot extends from the level of the axis of the drum 20 nearly to the top of the spherical enclosure so as to clear the wing 19 when it is fully unwound from the drum as well as when it is completely wound thereon. The spherical form of these enclosures is well adapted for reducing the fluctuation of the air forces exerted thereon and gives them a fairly low coefficient of air resistance.

Fig. 16 illustrates an aircraft adapted for a higher speed range than those previously described, the fixed wings 136 and control surfaces 137 having a considerably smaller area and the rotating wings 138 a greater diameter. The wing drums 139 are small and the rear ends of the drums are made in a streamlined form for minimum air resistance. All the gear mechanism of the rotor hub 140 is completely enclosed. The rotating system is retracted into the fuselage, when desired, through the opening 141 in the top of the aircraft. In this embodiment the opening 141 is closed, when the rotor system is not in operation, by means of a sliding panel 142 in the same way as in the previously described embodiments.

As shown in Fig. 16 an eight cylinder V motor, for instance, may be mounted in the fuselage somewhat behind the center of gravity. The seats 161 for the pilot and passenger are placed ahead of the center of gravity and slightly staggered one behind the other. A drive shaft 162 extends from the motor 160 to the gear box 163 in the nose of the fuselage and runs between the pilot and passenger. A variable pitch propeller 164 is driven by the shaft 162 and, if desired, a gear reduction may be provided by the gear box 163. The upper portion of the fuselage at the nose ahead of the pilot and passenger is composed of a transparent covering 165 to provide visibility. This construction provides the maximum visibility in all directions for both the pilot and the passenger without in any way detracting from the unbroken streamline form of the fuselage.

Another modification of my invention is illustrated in Figs. 8 to 10 inclusive. In this construction the rotor has four blades 19 which, when retracted, are housed within a cylindrical turret 181. It is advantageous, from the point of view of low speed performance, to have the blade area large but with due consideration to maintaining the unit small and compact when the wings are wound up and retracted. A four bladed assembly is more economical of space than one with two blades having the same blade area when it is housed within a cylindrical turret as shown.

The four drums 20 upon which the wings 19 may be wound are carried by the arms 182 spaced radially around the rotating hub 43. Each drum is provided with a worm gear 66 meshing with a worm 65. The worm 65 is driven from the central helical gear 63 through a shaft passing through the arm 182 and connecting the worm 65 with the gear 64 which meshes with the central gear 63. As seen, the four gears 64 are equally spaced around the periphery of the central gear 63.

The turret 181 is carried on supporting members 183 projecting upwardly from the arms 182. The turret 181 is in the shape of a cylinder having walls 189 and closed at the upper end by a cover 184. The cover 184 overhangs the wall of the turret to form a lip 185 around the top of the turret. A circular opening 186 is provided in the top of the fuselage 187 into which the turret may be retracted. This opening is recessed at 188 so that when the turret is in its lowermost position the lip 185 of the cover will fit into and make a tight seal with the top surface of the fuselage. The cover is convex and, in the retracted position, exactly conforms to the curvature of the fuselage which is the same in front and side view to provide an unbroken surface.

The rotating hub 43 is carried by a central hub 36 which pivots in any direction on pins 42 and 43, as previously described. The rotor assembly may be hydraulically projected up from or retracted down into the fuselage as described in connection with the construction shown in Fig. 3. The wall 189 of the housing 181 is provided at its lower end with a curved portion 190 forming a section of a sphere, tiltable for purposes of control. This spherical portion of the wall 189 permits the turret to be tilted in any direction for control purposes while keeping the same clearance between the walls 189 of the housing and the opening 186 in the fuselage. The walls 189 are provided with slots 191, one for each blade. These slots are so dimensioned as to permit the blades 19 to be extended or wound up on the drums and also permit the blades to swing in the plane of rotation as well as in a vertical direction.

The tilting of the rotor assembly may be accomplished through a control tube 192 carried by the hub 36. At its lower end tube 192 carries a member 193 slidably connected to the rod 194. The rod 194 is pivoted at its lower end to a shaft 195. Movement of the rod 194 transversely of the fuselage is obtained by rotation of the shaft 195 and longitudinal movement is obtained by operation of the link 196 connected to the rod 194. The shaft 195 and link 196 may be connected to the control column (not shown) in such manner as to provide proper movement of the rod 194 for normal control by the rotor in flight with the standard movements of the control column.

A radial motor 197 is mounted in the fuselage behind the rotor supports with its cylinders in a horizontal plane. Baffle plates 198 are placed around the cylinders so as to extend between the fins of adjacent cylinders. The motor is cooled by means of air taken in through forwardly directed openings 199 below the plates 198, and discharged through backwardly directed openings 212, above the plates 198.

The propeller 200 is mounted at the bottom of the fuselage to provide proper clearance below the blades of the rotating wing and is driven by the propeller shaft which connects to the engine through an over-running clutch 201. The rotating wing may be driven by means of the friction disc 202 and friction wheel 203. The friction wheel 203 is attached to a hub 204, which is slidable along the propeller shaft 205 and is keyed thereto. The friction wheel 203, together with its hub 204, is moved along the shaft 205 by means of a control rod 206. To insure a positive frictional engagement, the disc 202 is forced downwardly against the face of the friction wheel 203 by spring 207. The faces of the disc 202 and the friction wheel 203 are of such material as to have satisfactory frictional characteristics and at the same time to be resistant to wear. The yoke 208 in the slot 209 permits the friction wheel 203 to be moved along the shaft 205, while said shaft is rotating. When friction wheel 203 is in the position shown in Fig. 8, there is no contact between it and the disc 202, so that in this position the effect is that of a disengaged clutch. When the friction wheel is moved to the left, it engages the outer edge of disc 202 so as to drive the shaft 37 at a low speed, corresponding to a relatively low rotational speed of the rotating wing. As the friction wheel 203 is moved further to the left, the gear ratio between the shaft 205 and the shaft 37 is reduced. Thus a larger portion of the power of the motor 197 may be imparted to the rotating wing at the will of the operator by moving the rod 206 to the left. This variable gear ratio transmission provides a means for applying any desired portion of the power to the rotating wing. Other variable gear ratio means may also be employed for securing this result. Especially during climb, ceiling and low speed flight, it is advantageous to apply a considerable amount of power to the rotating wing, but this must be limited to an amount which will not generate a torque reaction greater than can be satisfactorily overcome by the controls.

The alighting gear consists of wheels 12 carried by members 92, which are hinged to the fuselage and braced thereto when in the extended position by members 210 (Fig. 10). This alighting gear may be retracted backwardly as illustrated in Fig. 3. Recesses for the members 92 and brace members 210 are provided in each side of the fuselage and recesses 211 are provided to receive the wheels 12. When the wheels are in the retracted position the members 92 and brace members 210 fill in the recesses to provide a smooth fuselage surface, and the cover plates 178 carried adjacent the wheels by members 92 close the openings 211.

In this modification the rotation of the rotor system may be started as soon as the turret 189 begins to rise out of the fuselage. The unwinding of the blades may be initiated as soon as the rotor reaches a position where the first links of the blades clear the fuselage. Thus the blades can start to unwind when only a portion of the turret is exposed above the fuselage. The blades will then continue to unwind while the turret rises and will be fully extended when the turret reaches its uppermost position. In Fig. 10 the position of the turret is shown when the blades are partially extended in the process of unwinding or winding up. It is preferable to cause the turret to descend at the proper speed while the blades are being wound in, and rise gradually while they are unwinding, because the resistance imposed by the projecting turret should decrease or increase gradually as the blades wind in or out so that the supporting surface increases as the drag increases, and vice versa. In other words, the turret should rise above the surface of the fuselage only as much as necessary to permit the wing to unwind until a considerable portion of the wing is in operation. Thus considerable additional supporting surface is provided before there is too great an increase in resistance and reduction in speed.

The operating mechanism for extending and retracting the turret can be so proportioned relative to the rate at which the blades unwind as to comply with this requirement and also to assure adequate clearance for the rotating blades above the fuselage. Other means for accomplishing these objects may also be provided.

It will be noted that the fuselage is of aerofoil shape with the propeller mounted at the lower forward extremity. This permits the mounting of the turret directly in the top of the fuselage, while providing proper clearance between the propeller and the rotating wings. This type of fuselage will provide the same advantageous arrangement for mounting other types of rotating wing directly on top of the fuselage. The position of the propeller in this arrangement requires a higher alighting gear to provide proper propeller ground clearance. However, as the alighting gear is retracted during flight and the landing speed is low, this presents little difficulty. If desired, a fuselage of this section may be made to contribute to the lift. It is desirable at high speeds to avoid too great a curvature of the rear portion of a streamline body such as a fuselage of the section here described. The curvature can be more equally distributed between the top and bottom surfaces to the rear of the maximum thickness by raising the center line of the fuselage toward the rear, thus reducing the top curvature by adding to that of the bottom. This reduces the tendency for the airflow to separate from the surface and therefore tends to reduce the drag.

Aircraft of the type of this invention may land in restricted areas and should therefore preferably be able to take off in limited space as well. For this and other reasons it is desirable that means should be provided to enable the aircraft to rise into the air without forward motion over the ground, or at least with very low forward speed. It is advantageous for this purpose to utilize the momentum of the blades rotating at super-normal speed to supply additional power for the initial rise into the air. For this and other purposes, it is desirable to provide means for varying the angle of incidence of the rotating blades relative to a plane perpendicular to their axis of rotation. This change of blade angle may be accomplished in a manner which will now be described.

Referring more particularly to Figs. 12, 12a, 12b, 13, and 14, the blades 19 are pivotally anchored to the drums 20 by means of a pivot 212, which is parallel to the axis of the drum 20 and substantially parallel to the chord of the wing. The drum 20 is rotatably mounted by means of bearings 213 on a sleeve 214 located within the drum. The sleeve 214 is pivotally mounted on trunnions 215 and 216, which define an axis 217 upon which the sleeve may oscillate to permit the extended blade to lie in a generally radial direction with respect to the axis of rotation, as shown in full lines in Fig. 12, and to occupy other positions fore and aft of the radial position, as indicated by the lines 218, 219 and 220, 225 respectively, as shown in Fig. 12. The axis 217 may have a fixed angular position relative to the axis of rotation about which it rotates.

The wing 19 has a series of pivotal joints along its entire length similar and substantially parallel to the pivot 212, as more fully described and illustrated in the above referred to copending application Serial No. 112,888. Because of these pivotal joints and the freedom of the drum 20 to revolve about its axis, the wing is free to assume a position with respect to the vertical direction determined by centrifugal force and lift, regardless of forward or backward movements around the axis 217.

The axis 217 has a slope relative to the axis of rotation, the amount and direction of which may be defined by resolving the slope of the axis into two components, each projected upon a separate reference plane. The first reference plane includes the axis of rotation and extends radially therefrom through the midpoint between the trunnions 215 and 216. This plane corresponds to the plane of the paper in Fig. 14, the axis of rotation being removed to the right and extending vertically. The trunnions 215 and 216 are shown projected into this plane and the projection of the axis 217 into this plane has an upward outward slope to the extent of about 6 degrees. For convenience I refer to this angle as the angle of outward slope. As a result of this angle, the trunnion 215 is located further away from the axis of rotation than the trunnion 216, as shown in Fig. 14. The second reference plane is parallel to the axis of rotation and perpendicular to the first reference plane. Fig. 13 is a view in this second plane, and the axis of rotation extends vertically behind the paper, substantially in alignment with the midpoint between the trunnions 215 and 216. The direction of rotation of the wing, including the drum 20 is to the left, as indicated by the arrow. The slope of the axis 217 has a component projected upon this second plane which forms an angle of about 45 degrees to the axis of rotation, the trunnion 215 being located to the rear of the trunnion 216 relative to the direction of rotation, as shown in Fig. 13. For convenience, I refer to this angle as the angle of backward slope.

The chord of the wing 19 is substantially parallel to the axis of the drum 20, and the wing is given the desired angle by inclining the axis of the drum 20 relative to a plane perpendicular to the axis of rotation. The wing 19 is in its autorotating position when at or near the radial position, and in this position should have a proper angle of incidence for autorotation, for instance about 4 degrees. As a result of the slope of the axis 217, the angle between the chord of the rotating wing 19 and a plane perpendicular to the axis of rotation, which may be called the angle of incidence, will vary in the following manner as the sleeve 214 carrying the drum 20 and the wing 19 oscillates backward and forward around the axis 217.

Referring to Fig. 12, the wing 19 may have its normal angle of incidence when somewhat behind the radial position, for instance, at the position indicated by the line 225, and there is a tendency for this position to be maintained by the effect of centrifugal force and the torque applied to the blade. Under the influence of varying forces, the blade 19 may swing into other positions forward or backward of the normal position. On account of the slope of axis 217 around which this forward and backward swinging motion takes place, the angle of incidence of the blade 19 relative to a plane perpendicular to the axis of rotation changes with this backward and forward swinging motion. Owing to the pivot 212 and the freedom of the drum 20 to turn upon its own axis, the wing 19 is free to swing backward and forward without at the same time rising and falling. If the wing 19 occupies the position 220, its angle of incidence will be near 0 or near the point of minimum drag. As the wing 19 swings forward from position 220, its angle of incidence continues to increase until it reaches the position 219, at which its angle of incidence is a maximum, for instance about 5 degrees. As it continues to swing further forward from position 219, its angle of incidence begins to decrease and at the position 218 its angle of incidence is smaller than its angle of incidence in the radial position.

For purposes of illustration, the effect of the slope of axis 217 in producing this variation in the angle of incidence may be separated into the component due to the angle of backward slope (Fig. 13) and the component due to the angle of outward slope (Fig. 14). If the axis 217 had an angle of backward slope only, the angle of incidence of the wing 19 would tend to decrease when swung either backward or forward from the radial position. As a result of the angle of outward slope, the position of maximum angle of incidence is located ahead of the radial position and the combined effect of the two components of the slope of axis 217 causes the wing 19 to change its angle of incidence in swinging backward and forward between positions 218 and 220, as previously described. By a suitable selection of the two components of the slope of axis 217, the position of the maximum angle of incidence 219 may be located at a position forwardly of the radial position and the rate of angle change may also be predetermined.

The degree of slope and the direction of the axis 217 and its effect upon the change of angle of incidence with forward and backward movements of the wing 19 may also be defined in a different manner to show more directly the relation between the direction of the slope and the position of maximum angle of incidence. For this purpose particular reference is made to Figs. 12, 12a, and 12b. The slope of the axis 217 will be defined as the angle between it and a plane perpendicular to the axis of rotation, which angle will be referred to for convenient reference as the angle of inclination. This angle is shown in Fig. 12a as the smallest angle between the axis 217 and the plane 222. The direction of axis 217 will be measured by the smallest angle between the plane containing this axis and a radial plane containing the axis of rotation and passing through the midpoint of axis 217, which angle will be referred to for convenient reference as the angle of direction. This angle is shown in Figs. 12 and 12b as the angle between the plane containing the axis 217 and the plane 223.

In Fig. 12a, the axis of rotation is located behind the plane of the paper and extends in a vertical direction. The plane 222 is perpendicular to the axis of rotation and passes through the midpoint of axis 217. The axis 221 of the drum 20 forms an angle of about 5 degrees with the plane 222, Fig. 12a being viewed along the line 219. As previously pointed out, the chord of the wing 19 and the axis of the drum 20 are substantially parallel, and will therefore have the same direction as the axis 221. The axis 217 makes an angle with the plane 222 of about 45 degrees, as shown in Fig. 12a. The angle of inclination, however, preferably has a value smaller than this for most applications, for instance, about 35 degrees. This increases the rate of change of the angle of incidence and permits the desired variation in the angle of incidence with a smaller backward and forward movement of the blade 19 around the axis 217.

Referring to Figs. 12 and 12b, the radial position or the radial plane 223 includes the axis of rotation and passes through the midpoint of the axis 217, projecting outwardly therebeyond. When the blade 19 is rotating about the axis of rotation, centrifugal force tends to hold the mass center of the wing 19 in the radial plane 223. This is the position occupied during autorotation when no torque is applied to the blades from the hub and is the position assumed in the event of motor stoppage. For this and other reasons, the plane 223 has been taken as a convenient plane to which the angle of direction may be referred.

The angle of direction is particularly important in establishing the position at which the maximum angle of incidence of the blade 19 indicated by the line 219 occurs relative to the radial plane 223. When the wing 19 lies on the line 219, it has its maximum angle of incidence, the angle decreasing as the wing swings either forward or backward from this position around the axis 217. This position of maximum angle of incidence bears a fixed relation to the plane parallel to the axis of rotation containing the axis 217. Thus the plane parallel to the axis of rotation which includes the line 219 is perpendicular to this plane containing the axis 217 and parallel to the axis of rotation. Fig. 12a is a view in this plane containing the axis 217 and parallel to the axis of rotation. I prefer to have the angle of direction somewhat less than 90 degrees so that the position of maximum angle of incidence 219 will occur in advance of the radial plane 223. Under these circumstances the angle of incidence of the wing 19 will always increase as the wing swings forward from the radial position around the axis 217. As an increase of the angle of incidence also increases the drag, this effect opposes the forward swing of the blade, thus insuring aerodynamic damping in the radial or autorotating position. In the preferred form of operation, where a small amount of torque is normally applied to the hub, the blade 19 will occupy a normal position somewhat to the rear of the radial plane 223, for instance a position indicated by the line 225. The amount of displacement backward of the radial plane 223 will be dependent upon the amount of torque applied. Aerodynamic damping will, however, always be assured as long as the position of maximum angle of incidence lies substantially ahead of this normal position, and this will always be the case when the position of maximum angle of incidence 219 lies ahead of the radial plane 223.

Referring now to Fig. 12b, the full line curve 224 indicates the change of the angle of incidence of the chord of the blade 19 relative to the plane 222 (Fig. 12a) as the blade swings backward and forward around the axis 217. It will be seen that the angle of incidence reaches its maximum of about 5 degrees at the position 219. Both in front and behind this position, the angle decreases as shown. The amount of this angle change per degree of backward or forward rotation of the wing 19 around the axis 217 may be varied by varying the angle of inclination, that is, the angle of the axis 217 to the plane 222 (Fig. 12a). If this angle is made smaller, the amount of angle change per degree of forward or backward movement of the wing 19 becomes greater, and vice versa. The curve 224 shows the change of angle of incidence with forward and backward motion for an angle of inclination of about 35 degrees.

It will thus be seen that the rate of change of the angle of incidence may be varied by varying the angle of inclination and that the position of maximum angle of incidence may be varied by varying the angle of direction. When the angle of direction is 90 degrees, the position of maximum angle of incidence will coincide with the radial plane 223, under which conditions the angle of incidence will decrease on either side of this plane. In this position the axis 217 slopes upwardly and backwardly in a manner similar to that illustrated in Fig. 13. The dotted curve in Fig. 12b indicates the position the curve 224 would occupy if the angle of direction were made 90 degrees.

It must be understood that the particular angles referred to are to be considered as exemplary and that the angles in question may be varied considerably for the attainment of desired results, within the scope of this invention.

The wings 19 occupy substantially the radial position 223 shown in Fig. 12 if no power is being applied to the rotating wing system from the motor. However, if a small amount of power is being applied to it, for instance through the friction disc and wheel 202 and 203, as shown in Fig. 8, the wing will normally occupy a position somewhat to the rear of the radial position, for instance the normal position indicated by the line 225. This position is determined by the torque applied to the hub, the drag of the blade, and the centrifugal force component tending to bring the wing into the radial position. When a small or moderate amount of power is being applied according to the preferred method of operation, the change of wing angle with oscillation about the axis 217 tends to limit the power absorbed and therefore the torque reaction. When the torque increases, the wing swings backward and the angle of incidence is decreased, thus decreasing the torque required to drive the wing at a given speed. This will be further clarified by the following description of the results achieved by certain arrangements of the axis 217.

Referring again to Fig. 12, the angle of incidence of the wing 19 at the position 220 may be close to the angle of minimum drag. Under these circumstances the wing can be rotated by the power of the motor up to a rotational speed considerably above normal. The large torque applied to the hub for this purpose will keep the wing at or near the position 220 and very little lift will be produced. By considerably reducing or discontinuing the application of power to the hub, for instance by bringing the friction wheel 203 to the position shown in Fig. 8, the wings 19 will swing forward into the vicinity of the radial position; at the same time their angle of incidence will increase and a large lift will be produced which will raise the aircraft off the ground either directly or after a short run. During flight, the wings 19 encounter fluctuating forces which cause them to oscillate about the axis 217. It is important that they be free to oscillate in this manner to avoid severe stresses which might otherwise be set up. When the wing under these circumstances occupies the radial position, or a position somewhat to the rear thereof, the slope of the axis 217 provides desirable aerodynamic damping of these backward and forward oscillations. When the wing 19 swings forward toward position 219, the angle increases, thus increasing the drag and producing a restoring or damping effect. If the wing swings backward toward position 220, its angle decreases, which effect also tends to restore or damp the oscillations. This arrangement tends to prevent or reduce such oscillations and contributes to the smoothness of operation and the prevention of excessive stresses in the rotating wing.

Immediately upon landing, particularly if the wind is strong, it is desirable to wind in the rotating wings. When the brake 62 is applied to cause rotation of the drums 20, the inertia of the wings 19 carries them forward strongly toward the position 218. It is desirable that this forward swing of the wing should effect a reduction of its angle of incidence so as to reduce the lift and prevent the aircraft from again rising off the ground or being tipped by the wind. The decrease in the angle of incidence from the position 219 towards the position 218 supplies this effect, the angle of the wing at the position 218 being less than its angle in the radial position. The strong application of the brake 62 results in a very quick passage of the wing through the position of maximum angle 219 to the position 218, where it is held until it is completely wound in.

It is advantageous to equip aircraft embodying this invention with superchargers and variable pitch propellers for maintaining the power of the engine and the optimum pitch of the propeller up to the highest altitudes at which good performance is expected from the fixed wing. Even with a small fixed wing, the speed will increase up to a considerable altitude, and the performance will not fall off until very high altitudes are reached if the motor power is maintained.

A brief description of the operation will now be given. After taxiing to the point of take-off, motor power is applied to the rotating wing system and the wings 19 are unwound completely but gradually so that they may gain the necessary speed to support their weight by centrifugal force as they unwind. The torque applied at the hub reduces the angle of the wings to the vicinity of minimum drag. Meanwhile, the variable pitch propeller may be adjusted by control 9 (Fig. 3) to substantially zero pitch so that there is no forward thrust and substantially all the power is available to rotate the rotating wing considerably above its normal speed. In the embodiment of Fig. 8 a similar effect may be attained by suitable control of the friction wheel 203 with respect to the disc 202. This speed having been attained, the pitch of the propeller is increased to a suitable low speed value, or the friction wheel 203 is moved a suitable amount to the right. This applies a decelerating effect to the hub of the rotating wing system, the wings swing forward, and their angle increases to the vicinity of the maximum value. The throttle is then suitably adjusted and the aircraft rises into the air, rapidly gaining forward speed under the influence of the propeller thrust.

The variable pitch propeller or the friction wheel 203 is so proportioned and adjusted and the throttle so set as to put into the rotating wing system only such amount of the motor power as will not generate a torque reaction which cannot be readily overcome by the controls, the remainder of the power being absorbed by the propeller. When a considerable altitude has been reached and it is desired to fly at high speed, the aircraft is nosed down somewhat to increase the speed, the rotating wing structure is then gradually wound in, the forward speed progressively increasing meanwhile. A speed sufficient for the support of the aircraft by the fixed wing at its highest usable lift coefficient should be attained before the rotating wing is completely wound up. This condition can be best complied with at very high speeds by a wing structure such as that shown in Fig. 8 where the drag can be progressively decreased as the wing is wound in. The rotation of the wing is then stopped and it is completely retracted into the fuselage, the opening being completely and smoothly covered. The aircraft then flies at its high speed without being handicapped by the rotating wing to any substantially greater extent than a slight additional weight.

When it is desired to land, the rotating wing system is raised out of the fuselage and put into rotation while the machine is still high in the air. The wings are then gradually unwound, the drag increasing and the speed diminishing meanwhile. When the wings are fully extended, the aircraft may proceed to land at a low forward speed and sinking speed, control being supplied mainly by tilting the axis of the rotating wing. The alighting gear may be extended simultaneously with the rotating wing or immediately before landing. If the motor is stopped the propeller driven by air forces will provide the power for extending the rotating wing.

Upon contact with the ground, the wings are immediately rolled up, thus eliminating the lift and putting the machine into a condition for taxiing and for storage in a small space.

Although the invention has been described in connection with the specific details of a preferred embodiment thereof, it must be understood that such details are not intended to be limitative of the invention except insofar as set forth in the accompanying claims.

I claim:

1. In combination, an aircraft having a fixed wing, a rotating wing on the upper side of the aircraft, said rotating wing being retractable and extensible during flight, a retractable alighting gear on the lower side of the aircraft, and common control means operable to retract and extend said rotating wing and said alighting gear simultaneously.

2. In combination, in an aircraft having a fixed wing and a rotating wing, control means for said fixed wing, said rotating wing being operable to control and balance said aircraft, operating means for said control means, means for extending and retracting said rotating wing during flight, and means for connecting said rotating wing to said operating means when said rotating wing is extended and for disconnecting the rotating wing from the operating means when the rotating wing is retracted.

3. In combination in an aircraft having a motor, a propeller, a fixed wing and a rotating wing, means for retracting said rotating wing, means for extending and initiating the rotation of said rotating wing, means for disconnecting said motor from said propeller and for applying power from said propeller, driven by air forces, to said second named means to effect the extension of the rotating wing when said motor is stopped.

4. In combination in an aircraft having a fixed wing and a rotating wing, said rotating wing being retractable and extensible during flight, a retractable alighting gear, common control means operable to retract and extend said rotating wing and said alighting gear simultaneously and additional control means whereby said alighting gear may be retracted without retracting said rotating wing and whereby said rotating wing may be extended without extending said alighting gear.

5. In combination, an aircraft having a fuselage, a rotatable rotating wing housing mounted in the upper part of the fuselage so as to normally form a continuous part of the upper surface of said fuselage when in a retracted position, said housing being adapted to be elevated above the upper surface of said fuselage, a rotating wing normally housed within said rotatable housing when retracted and adapted to be extended therefrom when the housing is in its elevated position, means for retracting said wing into said housing, and means for retracting the housing to its normal position to remove it and the rotating wing from the air stream.

6. In combination, in an aircraft, a fuselage, a rotating wing extending beyond said fuselage, the swept disc area constituting an airplane surface having a positive angle of incidence, a motor and propeller propelling said airplane surface, means connecting said motor to said rotating wing, means for automatically controlling the speed of rotation of the rotating wing to substantially eliminate the flow of air through said swept disc area in either direction while causing only moderate torque reaction, and adjustable airfoil means mounted at the rear of said fuselage in the slipstream of said propeller and subjected to the air rotated by said rotating wing to oppose the torque reaction of said rotating wing.

7. In combination, an aircraft having a wide speed range, a motor and propeller adapted to propel said aircraft at high speed, a fixed wing having a small area such that the stalling speed is substantially above the landing speed of the aircraft, said fixed wing having a large positive angle of incidence at high speed such that the small wing produces a large lift with a small drag, separate means for landing comprising a torsionally rigid articulated rotating wing adapted to be extended so that its diameter is substantially greater than the span of the fixed wing, controllable driving means for applying power from said motor to said rotating wing substantially to eliminate the general flow of air through while causing moderate torque reaction, controllable means for neutralizing said torque reaction, and means for retracting said rotating wing at high speed so that the aircraft is carried by said fixed wing.

8. In combination, in an aircraft, a completely streamlined fuselage of aerofoil section, a propeller mounted adjacent the lower front extremity of said fuselage, a turret adapted to be extended from and retracted into the upper part of said fuselage, said turret having an upper wall adapted to be substantially flush with the upper surface of said fuselage when the turret is retracted, and having a skirt depending from said wall, said skirt being provided with a slot, a rotating structure rigidly secured to said turret to support the same, a flexible wing carried by said structure and normally located within said turret, said wing being extensible through said slot above the top of said fuselage when the turret is projected, and means for retracting said turret to a position substantially flush with the upper surface of the fuselage when the wing is retracted and for projecting said turret upwardly into a position above the upper surface of said fuselage when the wing is to be extended.

9. In combination, an aircraft having a fuselage, a rotating wing housing mounted for rotation and for movement away from and toward the fuselage between retracted and projected positions, an extensible wing located in compact relation within said housing when said housing is in its retracted position, and means for rotating and moving said housing between its retracted and its projected positions and for progressively extending said wing during movement of said housing to its projected position and for progressively retracting said wing during movement of said housing from its projected to its retracted position.

10. In combination, in an aircraft, a fuselage, a centrally located rotating wing, the swept disc area of which constitutes an airplane surface having a positive angle of incidence, a motor and propeller propelling said aircraft and said airplane surface, means connecting said motor to said rotating wing to rotate the latter, means including variable speed ratio means in said connecting means for controlling the power supplied to the rotating wing substantially to eliminate the general flow of air through said swept disc area while causing only moderate torque reaction, and adjustable airfoil means mounted at the rear of said fuselage in the slipstream of said propeller and subjected to the air rotated by said rotating wing to oppose the torque reaction of said rotating wing.

11. In combination, in an aircraft, a fuselage, a centrally located rotating wing, the swept disc area of which constitutes an airplane surface having a positive angle of incidence, a motor and propeller propelling said aircraft and said airplane surface, means connecting said motor to said rotating wing to rotate the latter, means for controlling the power supplied to the rotating wing substantially to eliminate the general flow of air through said swept disc area while causing a moderate torque reaction, torque responsive means for limiting the torque reaction of said rotating wing, and adjustable airfoil means mounted at the rear of said fuselage in the slipstream of said propeller and subjected to the air rotated by said rotating wing to oppose the torque reaction of the said rotating wing.

12. In an aircraft having a fuselage, the combination including, a rotating wing housing, means mounting said housing for movement between a retracted position within said fuselage and a projected position above the fuselage, means mounting said housing for rotation, a rotating wing normally housed within said housing and adapted to be extended therefrom, means for moving said housing between its retracted and projected positions, and means for retracting and extending said wing into and from said housing while said housing rotates.

EDWARD F. ANDREWS.

CERTIFICATE OF CORRECTION.

Patent No. 2,330,803.　　　　　　　　　　　　　　　October 5, 1943.

EDWARD F. ANDREWS.

It is hereby certified that error appears in the printed specification of the above numbered patent requiring correction as follows: Page 11, first column, line 54, claim 6, before "flow" insert --general--; and that the said Letters Patent should be read with this correction therein that the same may conform to the record of the case in the Patent Office.

Signed and sealed this 18th day of January, A. D. 1944.

(Seal)

Henry Van Arsdale,
Acting Commissioner of Patents.